United States Patent [19]
Dalbon

[11] Patent Number: 5,464,640
[45] Date of Patent: Nov. 7, 1995

[54] PROCESS FOR PREPARING A DOUGH FOR ALIMENTARY PASTA

[75] Inventor: Gerardo Dalbon, Daré, Italy

[73] Assignee: M. G. Braibanti S.p.A., Milan, Italy

[21] Appl. No.: 100,987

[22] Filed: Aug. 3, 1993

[30] Foreign Application Priority Data

Aug. 4, 1992 [IT] Italy .................................. MI92A1918

[51] Int. Cl.⁶ ..................................................... A21D 8/00
[52] U.S. Cl. .......................... 426/231; 366/141; 426/504; 426/557
[58] Field of Search ..................................... 426/231, 504, 426/479, 481, 557; 366/141, 152, 177

[56] References Cited

U.S. PATENT DOCUMENTS

| | | | |
|---|---|---|---|
| 3,077,408 | 2/1963 | Rozsa et al. | 426/479 |
| 4,414,276 | 11/1983 | Kiriyama et al. | 425/200 |
| 4,790,665 | 12/1988 | Hayashi | 426/504 |

FOREIGN PATENT DOCUMENTS 1201365  8/1970  United Kingdom.

Primary Examiner—George Yeung
Attorney, Agent, or Firm—Hedman, Gibson & Costigan

[57] ABSTRACT

A process for preparing a dough for "pasta", by starting from meals of cereals in general, which dough is to be sent to an extrusion screw, which process comprises:

(1) a step of separation of raw material into at least two fractions having different granulometries, each defined within a granulometric range;

(2) a step of checking the percent amounts of said fractions with different granulometry, by measuring the weight of each of said fractions, by means of a suitable device;

(3) a step of metering the above said fractions and of metering water for each of said fractions, in a variable ratio, by means of a first metering device for the solid phase and a second metering device for the liquid phase; and (4) a different kneading step different for each granulometric fraction.

15 Claims, 2 Drawing Sheets

PROCESS FOR PREPARING A DOUGH FOR ALIMENTARY PASTA

The present invention relates to a process and device for preparing a dough for "pasta" to be sent to an extrusion screw.

In the prior art, in order to produce "pasta", whether fresh or dry, machines are used which comprise, according to the type of "pasta" to be produced, besides other equipment pieces, a set of kneaders which knead the solid-phase raw material, normally constituted by a meal of hard wheat or soft wheat with water added in an adjustable percent amount, for a time period generally comprised within the range of from 10 to 15 minutes.

The resulting dough is then sent to an extrusion screw for being submitted to a compression step and immediately thereafter is extruded into the desired shapes.

In particular, it should be reminded that the most widely used raw material for producing pasta is bran, or hard or soft sweet castor, which normally is produced by mills with a widely variable and, on an average, differentiated, granulometry, generally comprised within the range of from 100 to 450 microns.

Furthermore, during the past years, in order to improve an accelerate kneading, bran was preferably submitted to an additional step of re-milling, so as to obtain a raw material with a finer granulometry and, above all, with more restricted variations from the average value, i.e., with a more uniform granulometry.

This, because raw material fractions with different granulometric characteristics display a tendency to get imbibed with water to different extents.

Furthermore, such a difference in imbibition rate for fractions with different granulometry characteristics implies a further drawback. In fact, the finer fractions, by absorbing water more easily, initially decrease the statistic water availability to larger-size fractions.

The imbibition of the latter, which already is per se lower, is statistically slacked down, with the water amount "captured" within a defined time interval by said larger-granulometry fractions decreasing.

Then, it should be taken into account that the finer particles are inherently more subject to the specific reaction catalyzed by amilase enzyme, owing to the presence of a large number of already broken starch granes, which enzymatic activity results to be accelerated with increasing dough temperature.

Furthermore, it has been known for long that the level of reducing sugars present in the extruded pasta is correlated with the Maillard's reaction.

With the thermal treatment being the same, Maillard's reaction will be the more intense, the larger the concentration of reducing sugars present in the semifinished product being processed.

The purpose of the present invention is of obviating the disadvantages indicated hereinabove.

Such a purpose is achieved by means of a process fop preparing a dough for "pasta", by starting from meals of cereals in general, which dough is to be sent to an extrusion screw, characterized in that said process comprises:

(1) a step of separation of raw material into at least two fractions having different granulometries, each defined within a granulometric range;

(2) a step of checking the percent amounts of said fractions with different granulometry, by measuring the weight of each of said fractions, by means of a suitable device;

(3) a step of metering the above said fractions and of metering water for each of said fractions, in a variable ratio, by means of a first metering device for the solid phase and a second metering device for the liquid phase;

(4) a different kneading step for each granulometric fraction.

The cereal meals treated by means of the process according to the present invention can be soft wheat or hard wheat meal, bran, castor or double-milled meal.

In particular, the step (4) of kneading of the different fractions takes place initially inside different tanks and then inside common tanks, and such a step may be different for the several fractions as regards the kneading time, the kneading water temperature, the temperature-control water temperature, and the mechanical energy transferred to the dough.

A further object of the present invention is a device for implementing the process according to the present invention, characterized in that said device comprises, in cascade, a raw material storage device, a facility for metering said raw material on a weight basis, a system for sieving, and performing the granulometric classification of, the meals, installed upstream from at least two systems for determining the weight of each fraction with different granulometry, each of them being connected, at its downstream side, with a relevant liquid phase metering system, a relevant solid phase metering system, a relevant water and meal mixing facility installed on the inlet side of a relevant first kneading tank, with said at least two kneading tanks being connected, either directly or through at least two optional tanks, with at least one further kneading tank, with said at least one further kneading tank leading to at least one vacuum tank downstream from it, which vacuum tank is connected, in its turn, with at least one system for dough compression, extrusion and drawing.

In particular, the sieving facility may be of "Plansichter" type, and the metering systems provided for solid phase and liquid phase metering are in an equal number as of the desired granulometric fractions.

The possibility of matching the kneading time to the several granulometric fractions is furthermore supplied according to two distinct operating modes, which may be used either alternatively or jointly.

For each specific granulometric range, the first kneading tank through which each individual fraction is caused to flow is properly dimensioned in order that, for a constant volume of dough production, the transit time through the tank is comprised within the range of from 10 seconds to 800 seconds.

Furthermore, said at least two first kneading tanks or, when present, said at least two optional tanks, are connected with a mobile saddle which makes it possible their relative position to be varied relatively to the point of dough discharge into at least one further kneading tank.

For each specific meal granulometric range, a movement of sliding of the first kneading tank can hence be then carried out which, by varying the point of dough discharge into the subsequent downstream tank, compensates for the change in stay time in the first kneading tank, caused by the change in flow gradient of the granulometric fraction.

The total stay time inside said at least two first kneading tanks, or, when present, inside said at least two optional tanks, and in said subsequent downstream tank, with the other conditions being the same, will result to be the same for different flow gradients.

In particular, said kneading tanks are of the type with paddles installed on revolving reels and can possibly be equipped with an additional system for air removal. Furthermore, said paddles or blades are orientatable and the revolution speed of the reel can be varied by means of a speed change device (for example, an inverter) and the contact surface with the dough is thermostatted by means of a temperature control jacket with thermal regulation of temperature control fluid.

One of the advantages of the present invention consists in the decrease in the amount of sugars derived from physical-chemical reactions induced during the kneading operation.

Furthermore, the solid raw material can be fractionated into N fractions, with N larger than or equal to, 2, with each of said fractions displaying well-defined granulometric attributes, thus making it possible the use of a raw material with a whatever initial granulometric spectra to be allowed, with particular preliminary grinding procedures being thus unnecessary.

A further advantage of the present invention consists in the possibility of matching the kneading time to each individual fraction with different granulometric characteristics.

The technical features and the further advantages of the present invention will be clearer from the following illustrative disclosure made by referring to the accompanying figures.

Figure 1:
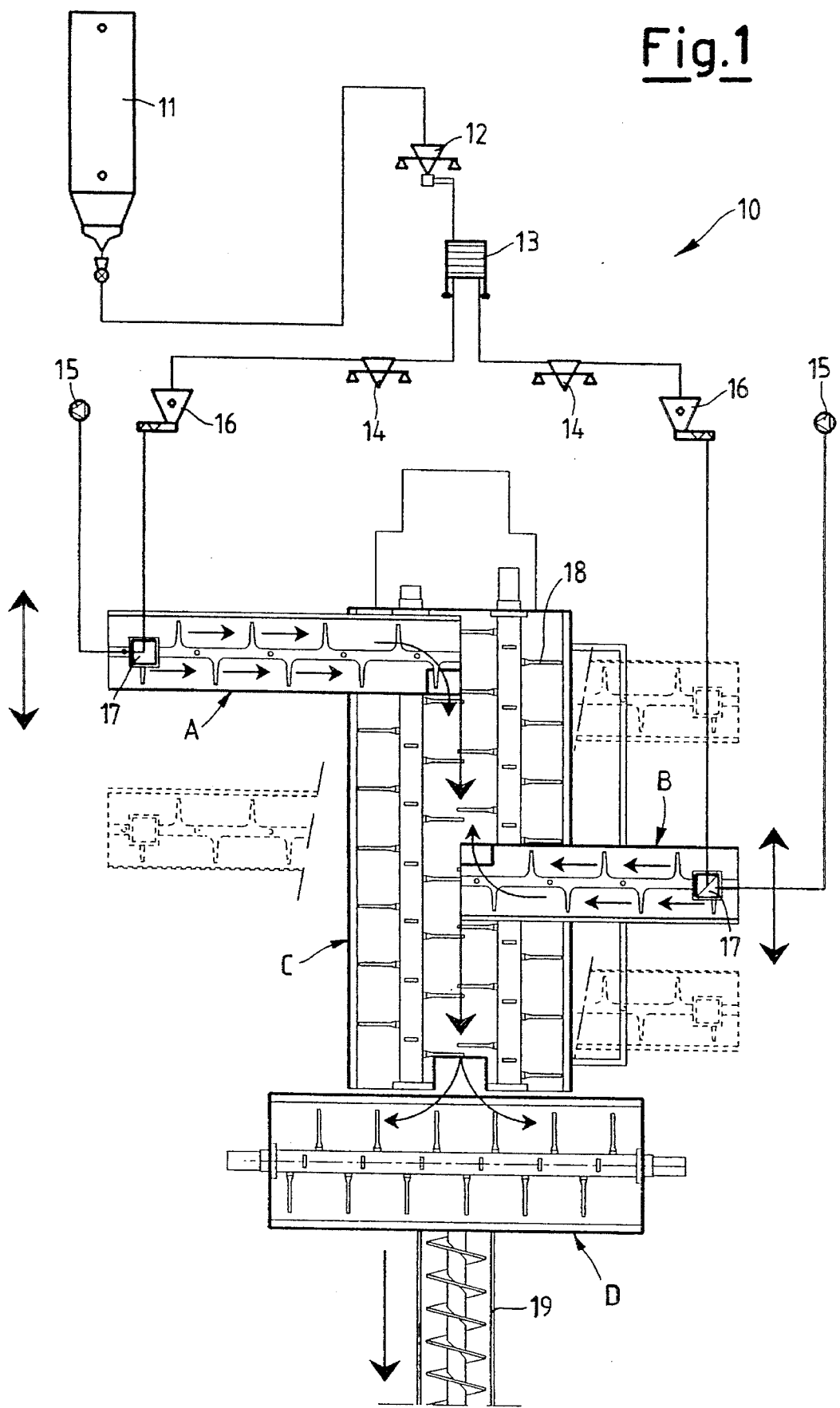
FIG. 1 is a schematic view showing a device for implementing the process according to the present invention.

In FIG. 1, in the device which is generally indicated with 10, a storage device or silo 11 for storing the raw materials, generally constituted by cereal meals, a facility for weight measurement of raw material 12, a system for sieving, and performing the granulometric classification of, meals 13, two systems for weight measurement of fractions of different granulometry 14, two metering systems for metering the liquid phase 15 and two metering systems for the solid phase 16, two facilities for water and meals blending 17, arranged on the inlet side to two kneading tanks A and B, provided with paddles with revolving reels 18 and possibly with an air removing system, are installed in cascade.

Such tanks A and B are into communication with a further kneading tank C leading to a vacuum tank D, which in its turn is connected, through a dough from-kneading-tank-to-screw-unit-transfer system (capsulism), to a dough compression, extrusion and drawing system 19.

Figure 2:
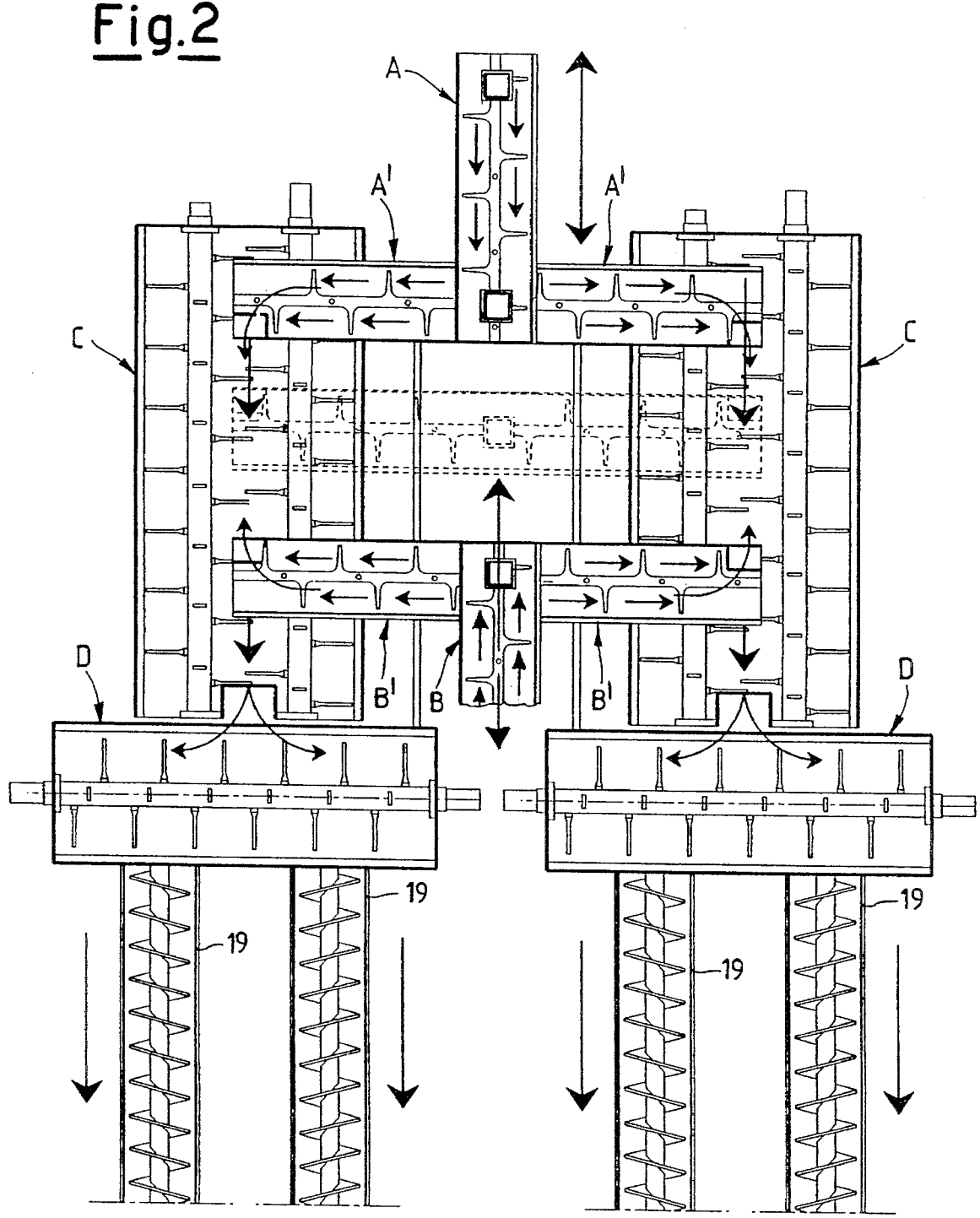
FIG. 2 is a schematic view showing a different embodiment of the device according to the present invention.

In FIG. 2, a second embodiment of the device according to the present invention is displayed, which is used in the case of high production capacity systems (for example, with throughput rates higher than 1500 kg/hour). The device, which is at all similar to the one as disclosed in FIG. 1, is anyway equipped with a tank A' and a tank B', which connect the first kneading tanks A and B with the two downstream kneading tanks C.

Both tanks C are then connected with two vacuum tanks D, each of which is connected, in its turn, with two compression, extrusion and drawing systems 19.

The adoption of such a contrivance makes it possible the overall geometrical dimensions of the tanks to be limited, and charging the various fractions to a plurality of tanks C being made easier, with the overall kneading times, properly required for each different granulometric range being complied with.

According to a particular form of embodiment of the process of the present invention, only two fractions of raw material, for example, bran, are separated from each other.

In the step (1) of subdivision of the raw material into fractions, said raw material, viz., bran, having a whatever granulometry, coming from the storage silo 11, is weighed by means of a scale 12, and through the sieve, or vibrating sieve, or Plansichter 13, with a filtering mesh (free mesh opening) of a suitable preselected size, the subdivision into two fractions is carried out.

In particular, in this exemplifying embodiment, the large fraction displays a granulometry larger than 250 microns and the small fraction displays a smaller granulometry than 250 microns.

In the step (2) of the process according to the present invention, i.e. in the amount control step, the two fractions of raw material are individually metered by means of two weight measurement devices 14 and a mass balance is performed by comparison with the initially weighed amount by means of the scale 12.

In the metering step (3), the larger-granulometry fraction flows through a metering unit 16 and the desired percent amount of water is drawn, by means of another metering unit 15, mechanically in phase with the flow of solid raw material. Both components are charged to the tank A, through the blending facility 17.

On the contrary, the smaller-granulometry fraction flows through a second metering unit 16 and the desired percent amount of water is then drawn by means of another metering unit 15, mechanically in phase with the flow of solid raw material.

Both components, through a second blending facility 17, are charged to the tank B.

In the kneading step (4), the compounds charged to the tanks A and B are kneaded.

The time of such a kneading step depends on the specific design of the tanks. Starting from their capacity and from the average value of the transit speed of an unit volume of dough (transit speed which depends on the orientation angle of reel paddles), an average value is calculated of the transit time of the dough between the tank inlet and outlet ends.

In particular, the tanks A and B are given such a size that, in the case of the separation of only two fractions with different granulometric characteristics, the coarser fraction is kneaded for a time comprised within the range of from 2 minutes to 8 minutes, and the finer fraction is kneaded for a time comprised within the range of from 3 seconds to 300 seconds.

At the end of the respective stay times inside the tanks A and B, the doughs are discharged into a tank C. Such a tank C may also be a double tank, equipped with two twin reels, and with a considerably larger size.

The addition of the two doughs obtained from the two different fractions of bran or raw material in general, into the tank C, takes place at different points according to the scheduled kneading time.

At the end of the kneading operation inside the tank C, the by now uniform dough is poured into a vacuum tank D.

The total stay time of the whole dough in the kneading step (4) is the weighed summation of the individual kneading times relevant to the individual path lengths in each tank along which each individual dough amount was caused to travel. In the case of the larger-granulometry fraction, the total kneading time will be the total kneading time during the transit through the tank A, the tank C and the tank D; for the smaller-granulometry fraction, it will be the total of the transit times through the tank B, the tank C and the tank D. However, the transit time through the tank C is different for said two fractions: in fact, the larger-granulometry fraction also ran through the path between the discharge point from the tank A into the tank C, and the discharge point from the tank B into the tank C, whilst the smaller-granulometry fraction only ran along the path length comprised between the discharge point from the tank B into the tank C and the inlet to tank D.

Therefore, each dough fraction is initially treated inside a kneading tank which is different, for each dough fraction, both due to its geometrical dimensions and owing to its technological characteristics, such as the stay time inside the tank, the thermostatting temperature and the variation of orientation of the revolutionary reel paddles. At a later time, said dough fractions join each other in order to jointly continue their travel up to the end of the kneading step.

Summing-up, the possibility of matching the kneading time to the different granulometric fractions takes place according to two distinct modes, which may be either alternatively or jointly used.

For each specific granulometric range, the first tank through which each individual fraction flows, is properly dimensioned in order that, for a constant dough production volume, the transit time through the tank is comprised within the range of from 10 seconds to 800 seconds.

Furthermore, said tanks A and B, or, when present, A' and B', are connected with a mobile saddle which makes it possibile their relative position to be varied relatively to the discharge point into the tank C.

For every specific granulometric range, a sliding motion of the first kneading tank can hence be carried out which, by varying the dough discharge point into the subsequent tank, will compensate for the variation in stay time inside the first kneading tank caused by the change in flow gradient of the granulometric fraction.

The total stay time inside the tanks A or B plus C, plus A' and B' when present, with the other conditions being the same, will be the same for different gradients.

The extent of the translation of all of the discharge points will be regulated as follows: with varying flow rates of the interested granulometric fraction, the corresponding tank is moved, along the tank C, by a distance which is directly proportional to the change in stay time due to the above said flow change in said tank. Such a distance depends on the geometrical dimensions of the subsequent tank, and on the implied flow rates.

Such flow variations and the consequent translation lengths are calculated by a processor which authomatically takes into account the changes in flow rate and in relative position of the various tanks at each point in time.

In the particular case of a bran consisting of 60% of a fraction with larger granulometry than 250 microns and 40% of a fraction with a smaller granulometry than 250 microns, the different kneading time for the different fractions is set forth by the following table:

| Tank | Coarse fraction (minutes) | Fine fraction (minutes) | Average value (minutes) |
| --- | --- | --- | --- |
| A | 2 | — | 1.2 |
| B | — | 1 | 0.4 |
| C | 12 | 2 | 8 |
| D | 3 | 3 | 3 |
| TOTAL | 17 | 6 | 12.6 |

Should the whole dough be treated according to the classic way, with the kneading tanks having the same sizes, the kneading time would be of 12.6 minutes, a too long time for fine fractions and a not long enough time for coarse fractions.

On the contrary, in the embodiment according to the present invention, the different granulometric fractions, with the size of the several tanks and the characteristics of the raw material being the same, are treated for different times and under optimal conditions. In other terms, the kneading time is optimized for each different granulometric fraction, with the reactions leading to sugar formation being kept at a minimum.

The resulting semifinished product displays hence optimal rheological characteristics and such rheological parameters can be better controlled, said semifinished products display then a reduced tendency to undergo the Maillard's reaction and therefore, with the drying cycles subsequently applied being the same, the resulting pasta will have a higher biological value.

The step of imbibition of the solid raw material with water is optimized by means of the share of water absorption by each of the individual fractions with different granulometry being precisely defined. This makes it hence possible the dimensioning of the technological parameters of the facility, i.e. the path length run through by the different fractions in each tank and the stay time inside the kneading tanks, to be further improved.

The so prepared dough results hence to be in optimal conditions, with all its constituting particles being perfectly soaked, the adoption being made hence possible of a compression/extrusion device which applies smaller stresses to the dough, with the end quality of the finished product being improved.

On the contrary, in the traditional presses a considerable homogenizing work has to be done by the screw in order to eliminate the "white spots", which otherwise would be present, due to the not well-soaked coarse particles.

Finally, the possibility is supplied of fractionating the solid raw material into N fractions with N being equal to, or larger than, 2, which fractions are endowed with well-defined granulometric attributes, thus making it possible a raw material with a whatever initial granulometric spectra to be used, any particular grinding-milling procedures being hence rendered unnecessary.

A further advantage of the present invention consists hence in the possibility of matching the kneading time to each single fraction with, different granulometry. This makes it possible water distribution to be made uniform with the hydration of proteins and starch grains being optimized, and the enzimatic phenomena and, in particular, the formation of derived sugars, being kept at a minimum.

Such a matching and optimization of the kneading time of each single fraction with different granulometry, makes it also possible a considerably great energy saving to be achieved, because the average kneading time of the total dough constituted by the individual fractions results to be shorter than the kneading times according to the prior art.

I claim:

1. Process for preparing an extrudable dough for pasta from cereal meal said process comprising:

(1) separating raw cereal meal material into at least two fractions having different granulometries, each defined within a granulometric range;

(2) determining the weight percent amounts of said fractions with different granulometry, by measuring the weight of each of said fractions;

(3) metering a quantity of each of the above said fractions and metering water for each of said fractions, in a variable ratio, by means of a first metering device for said fractions and a second metering device for the water; and (4) separately kneading each granuolmetric fraction to form an extrudable dough for pasta.

2. Process according to claim 1, wherein said cereal meal is selected from the group consisting of soft wheat meal, hard wheat meal, bran, castor and double-milled meal.

3. Process according to claim 1, wherein in step (4) after the kneading of the fractions in different tanks, a second kneading takes place in common tanks.

4. Process according to claim 1, wherein the kneading conditions in step (4) are different for the granulometric fractions with regard to the kneading time, the kneading water temperature, the control of water temperature, and the mechanical energy transferred to the dough.

5. Process according to claim 1, wherein the time period of the kneading step (4) is matched to the different granulometry of the fractions to provide an extrudable dough.

6. Process according to claim 5, wherein each specific granulometric range is passed through a first kneading tank, said first kneading tank, through which each individual fraction, being sized to provide a transit time through said tank within the range of from 10 seconds to 800 seconds during continuous dough production.

7. Process according to claim 1, wherein in step (4), the kneading step takes place for each granulometric fraction in a first kneading tank, in an intermediate kneading tank and in a subsequent kneading tank, and the total residence time of the individual fractions in each of said kneading tanks being the same.

8. Process according to claim 7, wherein for each specific granulometric range, the first kneading tank is movable to vary the point of discharge of the dough into the intermediate tank to compensate for the change in residence time inside the first kneading tank due to a change in the residence time.

9. Process according to claim 7, wherein the total residence time of all of the dough in said kneading step (4) is the total of all of the individual kneading times based on the individual length of time each of the individual amounts of dough is run in each kneading tank.

10. Process according to claim 9, said total residence time for the largest-granulometry fraction is the total of the kneading time during the transit through a first kneading tank, a further kneading tank and a vacuum tank.

11. Process according to claim 9, wherein said total residence time for the smallest-granulometry fraction is the sum of the transit times through a first kneading tank, a further kneading tank and a vacuum tank.

12. Process according to claims 10 or 11, wherein the residence times of the two different granulometric fractions through said further kneading tank are different, said largest granulometry fraction running along the path length from the discharge point of said first kneading tank into said further kneading tank of said largest granulometry fraction, to the point of discharge from said first kneading tank of said smallest granulometry fraction and then running along the path length running between the discharge point of said first kneading tank of said smallest granulometry fraction into the further kneading tank of said smallest granulometry fraction.

13. Process according to claim 7, said residence time is computed by a processor which automatically takes into account the changes in flow rate in said first kneading tank.

14. Process according to claim 1, wherein a large fraction having a granulometry of more than 250 microns and a fine fraction displaying a lower granulometry than 250 microns are discharged from step (2).

15. Process according to claim 1, wherein each individual granulometric fraction is sized so that there is a coarse fraction and a fine fraction, each having different granulometry, said coarse fraction being kneaded for a time within the range of from 2 minutes to 8 minutes, and said fine fraction being kneaded for a time within the range of from 3 seconds to 300 seconds.

* * * * *